Dec. 27, 1938.  S. F. ARBUCKLE ET AL  2,141,188
SIGNALING SYSTEM
Filed Aug. 18, 1934   3 Sheets-Sheet 1
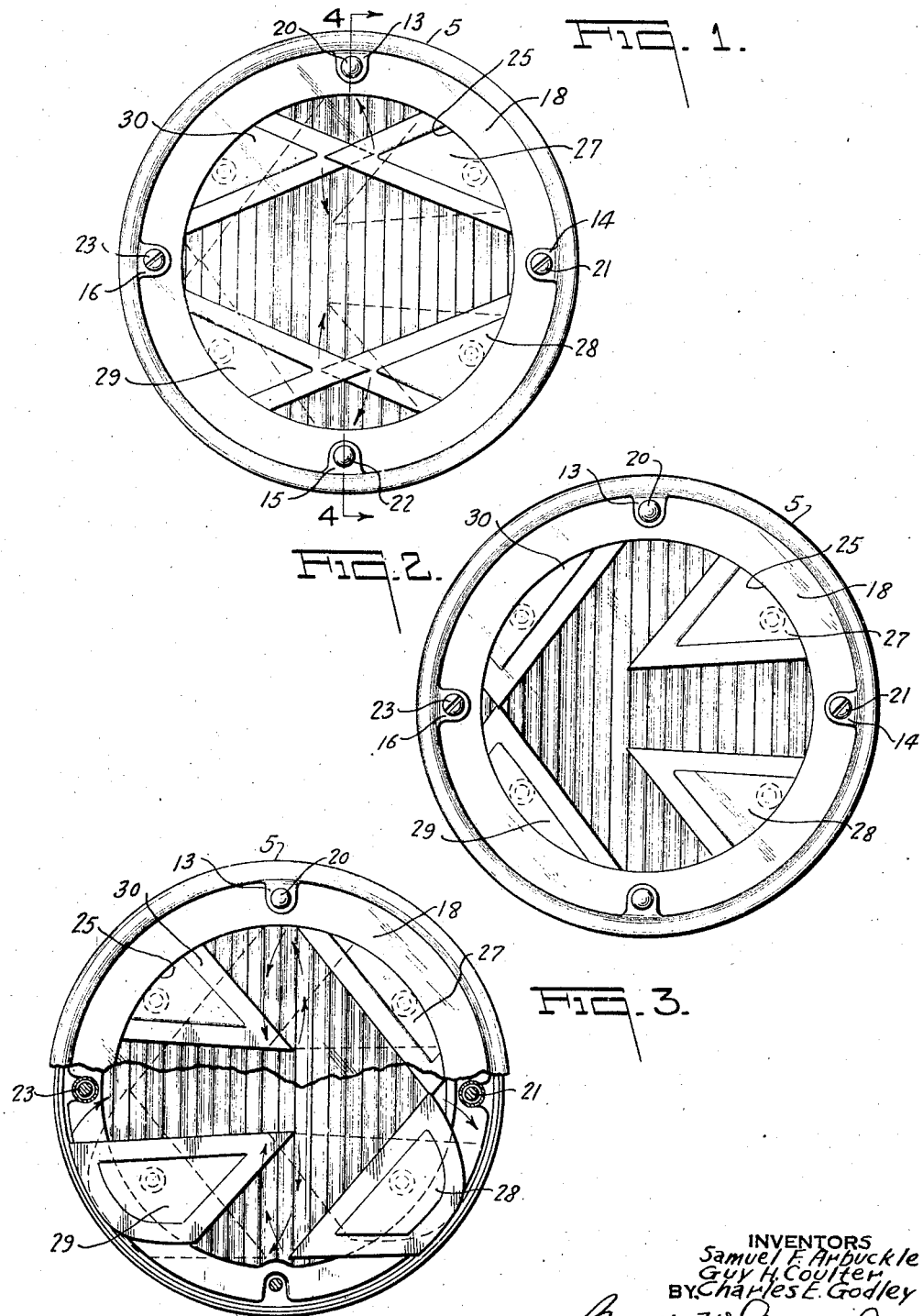
INVENTORS
Samuel F. Arbuckle
Guy H. Coulter
BY Charles E. Godley
ATTORNEYS Dec. 27, 1938. S. F. ARBUCKLE ET AL 2,141,188
SIGNALING SYSTEM
Filed Aug. 18, 1934 3 Sheets-Sheet 2
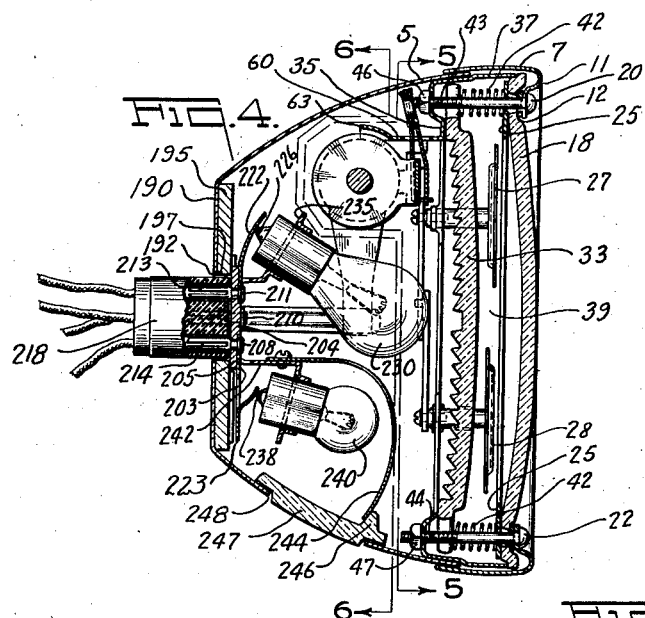
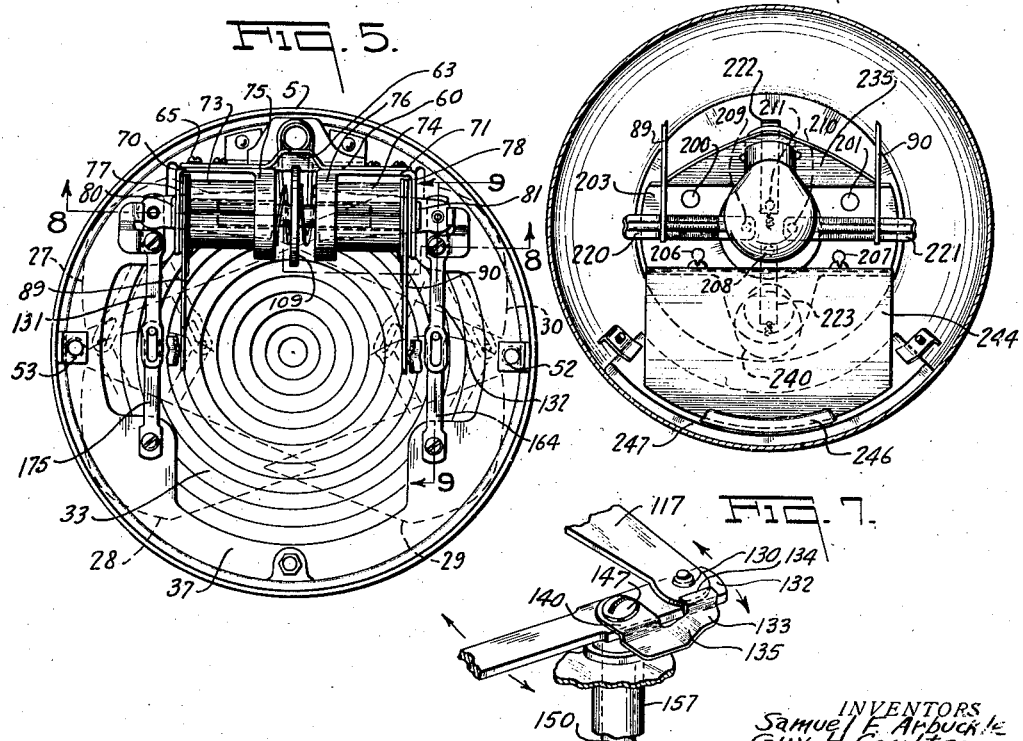

Dec. 27, 1938.  S. F. ARBUCKLE ET AL  2,141,188
SIGNALING SYSTEM
Filed Aug. 18, 1934  3 Sheets-Sheet 3
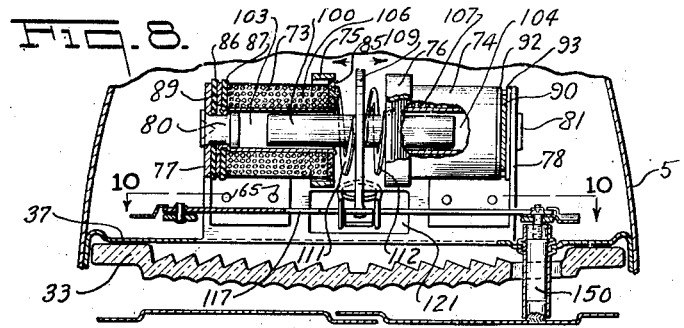
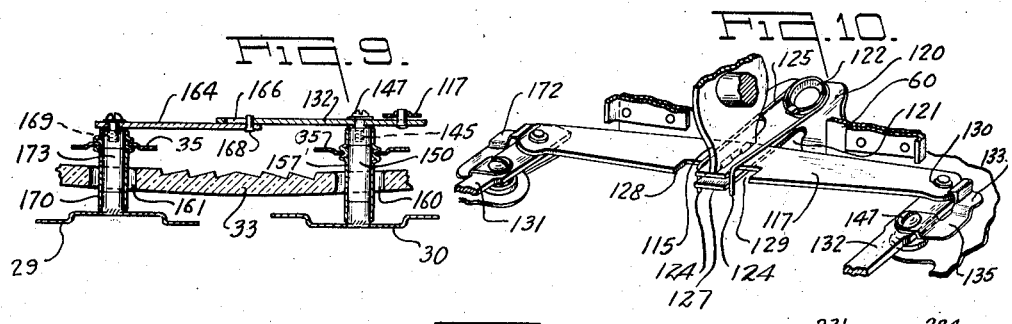
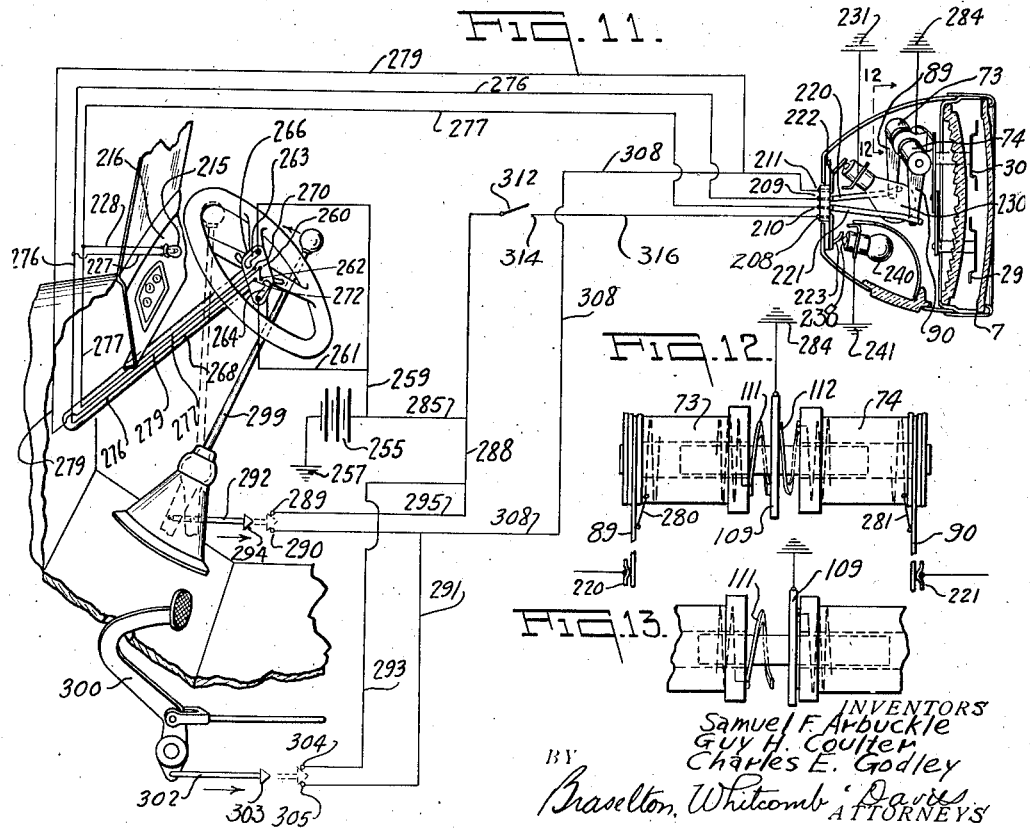
INVENTORS
Samuel F. Arbuckle
Guy H. Coulter
Charles E. Godley
BY Braselton, Whitcomb & Davis
ATTORNEYS Patented Dec. 27, 1938

2,141,188

UNITED STATES PATENT OFFICE 2,141,188

SIGNALING SYSTEM

Samuel F. Arbuckle, Guy H. Coulter, and Charles E. Godley, Highland Park, Mich., assignors to United Lens Corporation, Detroit, Mich., a corporation of Delaware Application August 18, 1934, Serial No. 740,400

5 Claims. (Cl. 177—327)

This invention relates to a signaling system and more particularly to an electrically operated system including a device capable of providing a plurality of signals having different characteristics.

The invention contemplates the provision of a unitary structure or arrangement for indicating several signals by means of outlines or indicias giving a reliable visual impression at all times.

The invention also embraces an arrangement for producing multi-visual signals of various configurations particularly for indicating various movements of a vehicle or other moving body with which the arrangement may be associated.

Another object is the provision of directional indicating indicia and a color scheme of the parts associated with the indicia for rendering various signals visible both at day and night.

A further object of the invention resides in an arrangement of this character incorporating a plurality of sources of light for use as a rear marker for a vehicle as well as to indicate deceleration of the vehicle as well as rearward movement thereof.

Still another object is the provision of an electrically actuated multi-signaling arrangement of this character which may be compactly arranged in a single comparatively small casing whereby a moisture and weather proof construction is obtained.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which Figure 1 is a front view of a form of a signaling device showing the signaling means in a normal or neutral position;

Figure 2 is a view similar to Figure 1 showing the signaling means forming a directional arrow to the left;

Figure 3 is a view similar to Figure 1 showing the signaling means forming a directional arrow to the right;

Figure 4 is a vertical, longitudinal, sectional view taken substantially on the line 4—4 of Figure 1;

Figure 5 is a transverse sectional view taken substantially on the line 5—5 of Figure 4;

Figure 6 is a transverse sectional view taken substantially on the line 6—6 of Figure 4;

Figure 7 is an enlarged isometric view showing movable indicia actuating link mechanism;

Figure 8 is a horizontal sectional view taken substantially on the line 8—8 of Figure 5;

Figure 9 is a fragmentary detailed sectional view showing the indicia actuating link mechanism taken substantially on the line 9—9 of Figure 5;

Figure 10 is an enlarged fragmentary isometric view showing elements of the indicia operating mechanism;

Figure 11 is a diagrammatic view illustrating circuit arrangements of the signaling device and the various operating means therefor;

Figure 12 is an enlarged fragmentary detail view showing elements of the indicia operating mechanism;

Figure 13 is a view similar to Figure 12 showing elements of the indicia operating mechanism in operative position.

A form of the invention is illustrated in connection with a signaling system used for visually indicating movements of a vehicle, but it is to be understood that the invention may be used in any place or with any structure where it is desired to create or produce visual impressions or signals.

Referring to the drawings illustrating a preferred form of a device forming one of the elements of the invention and particularly to Figures 1 and 4, the signaling device includes an outer metallic casing 5 provided with a removable rim 7. The periphery of the rim 7 is provided with an inturned or rolled flange 11 portions of which are formed to provide a plurality of equally spaced projections or lugs 13, 14, 15 and 16, each having an opening therein. A light penetrable closure or lens 18 is in engagement with the inner face of flange 11 the lens being formed with cooperating recesses such as 12 to accommodate the projections 13, 14, 15 and 16. The lens 18 and each of the projections are provided with openings permitting the passage of the bolts 20, 21, 22 and 23 which project inwardly of the casing 5. An annular member or border 25 located adjacent to lens or light penetrable wall 18, border 25 may be constructed of any suitable material preferably colored for the purpose of aiding in distinguishing the outlines of signals formed by the indicia forming members 27, 28, 29 and 30, located adjacent thereto.

A focusing lens 33 is positioned rearwardly of the indicia forming members and is held in properly spaced relation against a flange 35 forming part of the annular member 37, as particularly shown in Figure 4. The lens 33 is preferably made with a plurality of concentric prisms of different intensities and of a different color than the indicia forming members in order to provide suitable contrast increasing thereby the visibility of the signal. The lenses 18 and 33 and annular member 37 form a chamber 39 in which are located the indicia forming members 27, 28, 29 and 30. The peripheral edge of lens 33 is formed with openings for the passage of the bolts 20, 21, 22 and 23. The bolts 20 and 22 are each surrounded by coil springs such as 42 for the purpose of urging the border 25 against the periphery of the lens 18 and engaging the lens 33 with the surface of the flange 35. The flange 35 is formed with openings to permit passage of the bolts 20, 21, 22 and 23, the threaded end portions 43 and 44 of bolts 20 and 22 are coacting with threaded member or nuts 46 and 47 for the purpose of securing rims 7 and 37, as well as lenses 18 and 33 in fixed spaced relation thus forming a unitary sub-assembly.

As illustrated in Figure 5 the inner surface of the casing 5 fixedly supports L-shaped brackets 52 and 53 having threaded openings adapted to receive the threaded end portions of the bolts 21 and 23 thereby securing the rim 7 and the sub-assembly carried thereby, to the outer casing 5, a suitable space is provided between rim 7 and annular member 37 to accommodate the peripheral edge of casing 5 forming thereby an air tight and moist-proof housing.

As shown in Figures 4 and 5 the annular member 37 adjacent to the flange 35 is formed with a substantially right angle bent portion 60 having a centrally raised section 63. The portion 60 supports by means of a plurality of threaded members such as 65 a pair of spaced frames 70 and 71. Frames 70 and 71 are provided with end portions 77 and 78 projecting substantially at right angles from the main body portion for retaining the electromagnets or coils 73 and 74 in proper spaced relation, the inner end of each of the frames are bent forming split rings 75 and 76 for embracing each of the coils supporting the same in cooperating longitudinal alignment. Coils 73 and 74 are secured to frame 70 and 71 by means of studs 80 and 81 respectively, which have one end fixedly secured to the central portion or bore of the coils and its other end engaging suitable openings formed on each of frame portions 77 and 78.

Interposed between the outer end of coil 73 and the bent portion 77 of frame 70 are two insulating washers 86 and 87, which serve to retain in fixed position for proper relation with respect to the outer end of coil 73, a contact arm 89 which is used as a circuit connection for the energization of coil 73, as will be described.

Similarly located at the end of coil 74 is a projecting contact arm 90 which is suitably insulated and retained in fixed relation to the end of coil 74 by means of insulating washers 92 and 93. Projecting contact arm 90 also serves as circuit connecting means for the energization of coils 74.

Particularly shown in Figures 8 and 10, the electromagnets 73 and 74 are formed with a central opening for the purpose of receiving a magnetic core or bar 100, positioned within the non-magnetic sleeves 103 and 104, upon which are insulatingly supported the coil windings 106 and 107, which serve to impart the desired movement to the magnetic core 100.

Located between the inner end of electromagnets 73 and 74 is a member of disc-like configuration 109, the same being fixedly secured to the magnetic core 100. Member 109 is provided with a depending portion 115 which is secured to an arm 117 for the purpose of transmitting the reciprocating action imparted to magnetic core 100. Suitably carried by each of the inner ends of electro-magnets 73 and 74 are contact steps or spring members 111 and 112, having one end connected respectively to energizing windings 106 and 107, and having the other end adapted to be engaged by each of the faces of the disc-like member 109. Thus, these springs serve for establishing electrical connection between one end of the windings and the member 109 and also to retain the magnetic core 100 in its neutral position. Suitably spaced from arm 117 is a bracket 120 secured by a plurality of rivets to flange 35, forming an integral part of the inner ring 37, bracket 120 being positioned adjacent to an opening 121 formed on the laterally extending portion 60, the bracket 120 being provided with a ring-like projection 122 serving to retain in position the center coil of spring 125, the latter being provided with portions passing through opening 121 and located over arm 117 and having bent portion 124 adapted to engage the edges of the indentations 128 and 129, provided on arm 117, the bent portion 124 of spring 125 being also in cooperative engagement with projecting arm 127 which forms an integral part of bracket 120.

In order to transfer the reciprocating movement of arm 117 imparted by core 100 to the indicia forming members, the arm 117 as shown in Figures 7 and 10 has secured at each end a bearing 130 on which is journalled a pin fixedly carried at one end of each of the links 131 and 132 for the purpose of simultaneously oscillating said links.

For the purpose of effectively retaining one end of arm 117 in proper relation with link 132, the end portion of the arm is rounded and its edge is in alignment with the side walls of link 132, both being in engagement with the intermediate bent portion 133 of retaining bracket 135, which is provided with an end portion 134, urging the arm 117 and link 132 in proper contact. Retaining bracket 135 is secured by its end portion 140 to the pivotal point of link 132, in order to follow the movement of both arm and link.

Portion 140 of the bracket 135 has an opening to accommodate a threaded member 145 having an enlarged end head 147 which serves to secure in fixed relation link 132 to shaft 150.

As illustrated in Figures 8 and 9, link 132 is at its intermediate portion adjacent to its point of contact with arm 117 fixed to shaft 150 serving as its pivotal axis and being journalled on sleeve 157 fixedly carried by flange 35. Sleeve 157 projects through an opening 160 formed on lens 33 at the end of which is located the indicia forming member 30, which is secured to the end of shaft 150. Link 132 is connected at its other end to a pivoted arm 164 by means of a slot 166 coacting with pin 168 fixedly carried by one end of the arm 164. The other end of arm 164 is fixedly secured to a shaft 173 by means of a screw 169, the shaft serving as pivotal axis for arm 164 and being journalled on a sleeve 170 which is fixedly secured to flange 35 and projects through opening 161 provided on lens 33. Shaft 173 carries at its other end the indicia forming member 29. The other end of arm 117 is connected to link 131 and its associated pivoted arm 175 by means including the bracket 172 positioning links 164 and 175. The links 131 and pivoted arm 175 are arranged in a similar manner as link 132 and arm 164 in order to permit the proper actuation of indicia forming member 28 and 29 fixed at the end of their respective pivotal shafts.

The casing 5 as illustrated in Figures 4 and 6 is formed at the rear central portion with a flat surface 190 having an opening 192 for the purpose of accommodating the passage of circuit terminals. Secured to the inner surface of flat portion 190 is a reinforcing circular metallic member 195 provided with an opening 197 in alignment with the casing opening 192 and being retained in fixed relation to the casing portion 190 by means of threaded member 200 and 201, shown in Figure 6. Interposed between member 195 and a ring-shaped bracket 203 is a disc-like member of insulating material 205 which with bracket 205 is secured by means of the rivets 206 and 207 to reinforcing plate 195. The insulating member 205 has a central projecting portion 204 upon which are supported a plurality of current conducting member or terminals 208, 209, 210 and 211, these terminals are formed at one end with a plurality of contact studs such as 213 and 214 which are capable of contact engagement with a plurality of contact sleeves carried by the connecting plug 218. As shown in Figure 6, the terminals 208, 209, 210 and 211 are independently connected at their other end to arms 220, 221, 222 and 223 respectively. Contact arms 220 and 221 are engaged by projecting contact arms 89 and 90 which are connected with the coils 73 and 74 as hereinbefore described. The current conducting arm 222 as shown in Figure 4 engages a contact 226 located at the base of a light source or lamp bulb 230 which is supported on an opening with opositely projecting integral portions constituting a lamp socket centrally located in a bent portion 235 of the bracket 203.

The conducting arm 223 engages the filament contact 238 located at the base portion of a second light source or lamp bulb 240 which is supported on an opening formed with oppositely integral projections constituting a lamp socket formed on portion 242 of the bracket 203. The bent portion 242 of ring-like member 235 acts as support and securing means to one end of a translucent colored shade 244 which is positioned in front of light source 240 and which has its other end in engagement with a projection 246 of a light penetrable member 247 closing a window 248 provided at the lower portion of casing 5 for the purpose of illuminating the license number plate.

The circuits used for the energization of the electromagnets and sources of light forming the principal component parts of a signaling device hereinbefore described are illustrated in Figure 11 certain features being further illustrated in Figures 12 and 13. A suitable source of electrical energy such as a storage battery 255 is preferably used, the same being grounded to the body of the vehicle to provide a grounded system for these purposes, one of the terminals of battery 255 is grounded as at 257, the other terminal of said battery being connected through means of the conductors 259 and 261 to switches 263 and 264 which are positioned on the switch housing 266 suitably supported adjacent to the driver such as by the steering column 268 to control the operation of the signaling device proper. The switches 263 and 264 engage respectively the contacts 270 and 272 as well as contacts 260 and 262 which are connected by conductors 276, 277 and 279 to one end of the contacts 209, 210 and 211 respectively, supported on the central portion 204 of insulating member 205 closing the opening 192 of the casing 5. A light source 215 or other suitable tell-tale indicating device, used to indicate to the operator of the vehicle if the signaling system is in operation, is preferably secured to the dashboard 216 of the vehicle and is connected in the signaling system proper by the wires 227 and 228 in turn connected to conductors 276 and 277 respectively. Conductors 276 and 277 serve to establish a circuit connection between switches 263 and 264 with contacts 209 and 210 which in turn are connected to the winding of electromagnets 73 and 74 by means of arms 220 and 221 which coact with contacts 89 and 90 which carry conducting wires 280 and 281 leading therefrom to the ends of their respective coils 73 and 74. The coils 73 and 74 are each connected with a common ground 284 througn means of the springs 111 and 112 which engage disc 109. As particularly shown in Figure 13, disc 109 constitutes the ground connection and therefore the same is not affected by its reciprocatory movement when actuated by the electromagnets.

The circuit of the source of light 230 which serves to cause the illumination of the outlines or signals formed by the indicia forming members comprises the storage battery 255, conductors 259 or 261 connected respectively to switch blades 263 or 264 which serve to establish the circuit connection with stationary contacts 260 or 262 to allow the flow of current to light source 230 by the conductor 279 connected to stationary contact 211 carried by the rear portion of housing 5 which in turn is connected to arm 222 adapted to be engaged by the insulated contact 226 on the base portion of the lamp 230, which is connected to one side of the lamp filament, the other end being connected to the metallic base portion of the light bulb, which is in engagement with the socket 235 being grounded as at 231, thus forming the return circuit connection to the grounded terminal of battery 255.

The battery 255 is used to energize the light source 230 independent of the actuation of the switches 263 or 264 whenever the gear shifting lever is actuated to connect the engine with the driving shaft to impart rearward motion to the vehicle thereby serving as back-up light. This circuit comprises the live battery terminal lead 285, conductors 288 and 295, the latter being connected to stationary contact 289 adapted to be engaged by movable contact element 294 insulatingly carried by arm 292. Contact 294 also engages the stationary contact 290 which is connected by lead 308 to terminal 211 carried on the rear portion of housing 5, terminal 211 being in turn connected to bracket 222 which is engaged by insulated filament contact 226 carried by the base portion of the lamp 230, the filament of which has its other end connected to the metallic sleeve carried by the base portion cf lamp bulb which is in contact with socket 235 grounded as at 231, thus providing a suitable ground return to the battery. The movable arm 292 carrying contact 294 is secured to the gear shift lever 299 and is moved into a position engaging the contacts 289 and 290 by the forward movement of said lever when shifting gears into a reverse position thus closing the circuit mentioned and causing the energization of lamp bulb 230. When the lever is moved to another position, the contact 294 is moved out of engagement with the stationary contact, thereby breaking the circuit hereinbefore described.

The light source 230 is also used as "stop" or vehicle decelerating indicating means when pressure is applied to the brake pedal 300, thereby moving the arm 302 which insulatingly supports the bridging contact 303 into engagement with the stationary contacts 304 and 305, which form a parallel circuit with stationary contacts 289 and 290. This parallel circuit including the contacts 304 and 305 comprises the battery terminal lead 285, conductor 288, hence lead 293, conductor 304, movable contact 303, contact 305, lead 291, lead 308 and hence to terminal 211, to light source 230 and by means of the conducting bracket 222 to ground 231. It should be noted that when light source 230 is energized by the actuation of the gear shifting or by the operation of brake pedal 300 the indicia forming members are in many instances in the neutral position illustrated in Figure 1, due to the fact that the circuit of the electromagnets is not in all cases connected to the battery, when the engine control members are actuated.

The light source 240, which serves as a rear marker or tail light warning signal, is preferably of a lesser intensity than light source 230, and is connected to battery 255 by a circuit comprising conductor 285 connecting the live terminal of the battery 255 to a switch blade 312 the latter being moved into engagement with stationary contact 314 connected by lead 316 to the circuit terminal 208 supported on insulating member 204 carried on the rear portion of housing 5. Terminal 208 is in turn connected to one end of the filament of lamp 240 by conducting member 223, the other end of the filament being grounded as 241 through a metallic support 242 providing a suitable return circuit to the battery.

The operation of the signaling system including the indicia forming outlines or signaling means used in connection with an automotive vehicle can be summarized as follows: The device including the signal producing means may be supported in any readily observable portion of the vehicle, such as the rear or front portion, preferably in the position that is usually occupied by the tail light or warning signal; however, it is contemplated that the device may be located in any other suitable position. With the device located in any suitable and readily observable position, in case that the operator driving the vehicle intends to make a right or left hand turn, this will be visually indicated to any observer in advance of the course the vehicle is to take in the following manner: to indicate a left hand turn, the operator will throw the switch blade 263 into engagement with the cooperating contact 270, thereby permitting current from the battery 255 to pass through conductor 259 to the closed contacts 263 and 270, hence to conductor 277 to terminal 210 located at the rear portion of the signaling device, the terminal 210 being connected by means of projecting arms 221 and 90 to a lead 281, and thence to one end of the winding 107 of the electromagnet 74, the other terminal of this winding being connected by means of spring 112 to the grounded disc 109 as shown by ground 284. This will permit the flow of current from the battery to cause the energization of the electromagnet 74 to attract central core 100 moving it with disc-like member 109 and arm 117 to the right when looking at the device as shown in Figure 5, imparting its motion to pivotal links 131 and 132 connected at each extremity of arm 117, these links due to their interconnection with arms 164 and 175 will move the same to the left, in this manner slightly rotating the pivotal shafts secured to links 131, 132 and arms 164 and 175 so that the indicia forming members 27, 28, 29 and 30 are moved from their neutral position to form an outline for allowing the projection of a light beam the outline being in the form of an arrow, the apex of which is pointing to the left, as particularly illustrated in Figure 2 of the drawings. The position taken by links 131 and 132, as well as by arms 164 and 175, is indicated in dotted lines in Figure 5. In this position of magnetic core 100 the springs 112 as well as 125 are under tension.

The switch blade 263 also serves to simultaneously cause the energization of light source 230 when the electromagnets are energized through the engagement of stationary contact 260, which establishes a circuit connection between the light source 230 and battery 255 by the use of conductor 279 directly connected to terminal 211 carried by the rear portion of the housing 5 and which is connected to contact arm 222 engaging the insulated contact 226 located in the base portion of the lamp 230 which is connected to one end of the filament therein enclosed the other end of this filament being grounded by means of the socket forming part of bracket 203 which is grounded as at 231.

In addition, the engagement of switch blade 263 with contact 270 also causes the momentary energization of the light source 215 located on the dash-board of the vehicle producing a visual signal due to the fact that a circuit in parallel to the one causing the energization of electromagnet 74 is established when the switch blade 263 is in engagement with contact 270 this parallel circuit includes the filament of lamp 215 connected in series with the winding 106 of electromagnet 73 and comprises stationary contact 270, lead 277, conductor 228 connected to one end of lamp filament 215, the other end of filament being connected through leads 227 and lead 276 to terminal 209, hence to contact arm 220 located within the housing, the same being in engagement with contact member 89, connected by means of lead 280 to one terminal of winding 106 of the electromagnet 73, the other terminal of this winding being connected by means of spring 111 in engagement with disc 109 to ground 284. This circuit is momentarily established and its duration depends from the time the switch blade 263 is in engagement with contact 270 to the instant the reciprocating member 100 is attracted is moved from its central position by the energization by the winding 107 of the solenoid 74. The circuit is interrupted when the reciprocating bar 100 is moved towards electromagnet 74, as this will cause the disengagement of the disc 109 from the spring 111, thereby opening the circuit of the light bulb 215 by interrupting the ground connection. After the driver has completed the turning of the vehicle, the signal can be rendered ineffective by the disengagement of the switch blade 263 with the contacts 260 and 270 which will interrupt the current flowing through the electromagnet and light source. The springs 125 as well as spring 112 will return the magnetic core 100 to its normal position, moving arm 117 and the cooperating mechanism which serves to actuate the indicia forming member to its central or normal position, as shown in Figure 10 the ends 124 of spring 125 will line up the inside edges of notches 128 and 129 in arm 117 with the end portion of projection 127 of bracket 120 holding the mechanism under tension at neutral position, thus causing that the indicia forming member form an outline or indicia devoid of any directional indication, as particularly shown in Figure 1 of the drawings.

Whenever the operator desires to turn to the right, a visible signal may be indicated in advance of the course of the vehicle to any observer by closing the movable blade 264 which in turn causes the energization of the winding 106 of solenoid 73 which produces the attraction of magnet core 100 moving arm 117 to the right thus causing the interconnected links 131, 132 and arms 164 and 175 to move the indicia forming members to form the outline of an arrow, the apex of which is toward the right of the signaling device, as particularly shown in Figure 3. The light source 230 will also be energized whenever the switch 264 is moved into contact with stationary contact 272 due to the fact that the light is connected to the battery by the engagement of relatively stationary contact 262 with switch blade 264. It should be noted that the warning signal or light 215 located in the dashboard of the vehicle will also produce a momentary visible indication when the circuit of the electromagnet 73 is completed by the actuation of switch blade 264. In this case, the light source 215 will be connected in series with the winding 107 of the electromagnet 74, thus forming a circuit in parallel with the one causing the energization of electromagnet 73. This parallel circuit comprises stationary contact 272 connected to lead 279, which by means of lead 227 connects to one end of the filament of lamp 215, the other end of the filament being connected by lead 228 to lead 277 which in turn is connected to stationary contact 210 carried by casing 5. Contact 210 is in turn connected to the inward projecting arm 221 which engages contact arm 90, the latter connected to one end of solenoid winding 107 by lead 281, the other end of this winding being connected by spring 112 to the grounded member 109. The light source 215 will be momentarily energized and this circuit will be interrupted the instant that the electromagnet 73 attracts the magnetic core 100, moving the disc-like member 109 out of engagement with one end of spring 112, thus opening this circuit by interrupting the ground connection.

The interconnection of the light 215 in the system serves to provide a warning signal for the operator as to how the signaling device is functioning irrespective of which of the circuits of the electromagnets 73 or 74 is energized. Whenever the directional signal is connected to the battery, as hereinbefore pointed out, the light 215 is momentarily energized, thus providing a visual indication to the operator that the device is functioning properly. If either of the switches 263 or 264 is closed, and no light is produced by the signal light 215, the operator of the vehicle will become aware that no current flow has been established between the battery and the electromagnets. If the illumination produced by the light source 215 is of long duration, this fact will serve as a warning to the operator that the circuit to the electromagnets has been completed, but that the indicia forming members have not been moved to a position to provide an illuminated outline forming an arrow pointing to the direction which the vehicle is to take. By this particular arrangement, it would be noted that we provide a very efficient signaling system, the function of which is at all times indicated to the operator by a warning signal, in the present instance taking the form of a light source 215 located on the dashboard of the vehicle.

As hereinbefore pointed out, the actuation of the brake pedal serves to energize the light source 230 to provide a warning signal or stop signal. In addition, whenever it is desired to indicate that rearward motion is imparted to the vehicle, the motion of the lever 272 to accomplish this movement causes the closing of the circuit of the source of light 230, thus giving a warning signal and illuminating the road to the rear of the vehicle, allowing the driver to distinguish obstructions located at the rear of the vehicle.

It should be noted that particularly at night or on foggy days when the light 240 is used as a rear marker or tail indicator, the operation of the brake pedal 300 to decelerate the vehicle as well as the operation of the gear shift lever 299 will serve to close the circuit of the light source 230 and provide a very intensive illumination emitted through the neutral opening of the indicia forming member, as particularly shown in Figure 1, the illumination in this case being the summation of the intensity of the illumination produced by lights 230 and 240.

As hereinbefore pointed out, the focusing lens 33 is of a light penetrable substance, such as glass, being formed on one face with a plurality of concentric prisms of different angularity and intensity in order to project and reflect light passing therethrough and directed thereto from external sources, thus rendering the signal visible under all conditions. This lens is also formed with a plurality of vertically disposed flutes for spreading light. In a practical embodiment of the signaling device, the focusing lens is preferably of an amber color, for the purpose of providing a contrast between the indicia forming members and serving to distinguish the characteristics of the light beams projecting from the signaling device. The shade or light filter 244, which is located in front of the lesser intensity lamp bulb or tail lamp 240 is made of a flexible light penetrable material, preferably of a material such as a pyroxylin compound or Celluloid. This filter is of a red or ruby color and we have found that rendering the same translucent will avoid bright and blind spots from being projected through the focusing lens 33. In a practical embodiment of the signaling device, this light filter 244 is made translucent by using the shield 244 formed of a composite color having one face of a white pyroxylin and the other face being tinted of red or ruby color. The particular selection of an amber and red or ruby color for the light penetrable member 33 and filter 244 serves to provide means whereby light projected through the outlines formed by the indicia forming member will be a reddish light when the tail-light is energized. However, when the light source 230 is energized even though light source 240 is in operation, the color of the light emitted through the outline will be changed to an amber color, as the reddish light is rendered imperceptible to any observer due to the greater intensity and position of the source of light 230 with respect to concentric prisms which source of light is preferably located at the region of the focus of said prisms, to increase its normal efficiency. By this arrangement including light sources of different candle power and light penetrable members of different colors, we provide a very clear contrast distinguishing the rear marker or tail-light signal from the stop, back-up light, as well as from the directional signals each of which gives a signal of character clearly distinguishable from the other.

As hereinbefore stated, the indicia forming members 27 to 30 inclusive are located in front of the diffusing lens 33 and are made of a material having a different color than that of the lens 33 in order that the directional signal formed by these members can be readily visualized under all conditions, even though the light 230 may become ineffective or its filament burn out.

It is apparent that, within the scope of the invention modifications and different arrangements may be made other than is herein disclosed, and the present disclosure is illustrative merely, the invention comprehending all variations thereof.

What we claim is:

1. A signaling device for vehicles including a casing having an opening therein; means for closing said opening including a colored lens member; light obstructing means located in front of said colored lens member covering portions thereof; means to move said light obstructing means to selective positions; supporting means carried by the wall of said casing; a translucent member in said casing having a color characteristic different from that of said colored lens member carried by said supporting means rearwardly of said colored lens member; a light bulb carried by said supporting means and located rearwardly of said translucent and colored lens members; and means for energizing said light bulb whereby colored light is emitted through the visible lens area defined by the light obstructing means located in front of the colored lens, the colored light so emitted having a composite color characteristic produced by said lens and translucent members.

2. In combination, a casing having an opening therein; means for closing said casing opening including a colored lens member; a light translucent member having a color characteristic different from that of said colored lens member supported in said casing rearwardly of said colored lens member; light obstructing means located in front of said colored lens member covering portions thereof; a light bulb located rearwardly of said colored lens member; electromagnetic means for moving said light obstructing means located adjacent said colored lens member; means operable for simultaneously energizing said electro-magnetic means and said light bulb for moving said light obstructing means to define lens areas through which light passes and for illuminating said visible lens areas whereby light of the color of said colored lens member is emitted therethrough; a second light bulb supported to the rear of said translucent colored member and said lens member; and means for energizing said second light bulb whereby diffused colored light formed as a composite of the colors of said translucent and lens members is emitted through the visible lens areas defined by the light obstructing means.

3. A combined tail light and directional signal including a casing having an opening therein; an amber colored lens member included in the means for closing said opening; a light translucent member capable of emitting red light supported in said casing to the rear of said lens member; a pair of light bulbs supported in said casing, one located to the rear of said lens member and the second to the rear of the translucent member; a plurality of light obstructing interconnected pivotally supported members located adjacent said lens; mechanism to move said pivotally supported members defining an amber colored lens area through which light passes; means to simultaneously energize the first mentioned of said light bulbs with the operation of said mechanism whereby amber light is emitted through said colored lens area; and means whereby the energization only of the second mentioned of said light bulbs produces a composite colored light formed of the colors of said translucent member and said lens member is emitted through the visible area of said lens member.

4. In combination an open-ended casing; means for closing the end of said casing including a pair of lenses, one of said lenses being colored; light obstructing means located between said lenses to form a light transmitting opening of neutral configuration; means supported rearwardly of said lenses for changing the position of said light obstructing means; an electric light supported in said casing and located rearwardly of said lenses; means to energize said electric light when the light obstructing means are in a position producing light transmitting openings whereby light of the color of said colored lens is emitted through the light transmitting openings; a translucent element having a white surface and a colored surface supported in said casing rearwardly of said lenses and out of alignment with said electric light; a second electric light located rearwardly of said translucent element; means to energize said second electric light independent of the first electric light whereby the colored light passing through the light transmitting opening formed by said members is diffused, the light emitted through said lenses having as a predominant color the color of the colored surface of said translucent element.

5. In combination, an open ended casing; supporting means carried by a rear portion of said casing; a plurality of light filaments carried by said supporting means; a plurality of current conducting members insulatingly carried by said supporting means; a unitary subassembly adapted to close the open end of said casing including a light penetrable member with light obstructing means movable to different positions for defining areas for the passage of light rays through said member emanating from said light filaments, said sub-assembly also including electro-responsive means for moving said light obstructing means to different positions, said electro-responsive means having a plurality of conducting terminals adapted to engage said current conducting members; means to removably secure said subassembly to said casing causing the engagement of said conducting terminals and current conducting members for establishing circuit connections therethrough for said electro-responsive means from a source of current.

SAMUEL F. ARBUCKLE.
GUY H. COULTER.
CHARLES E. GODLEY.